Feb. 16, 1971 G. SABLAYROLLES ET AL 3,564,468

APPARATUS FOR CONTROLLING ELECTRIC CIRCUITS BY THE EFFECT OF A PLURALITY OF MEMBERS INFLUENCED BY A MAGNETIC FIELD AND ARRANGED IN PARALLEL

Filed June 17, 1969 3 Sheets-Sheet 1

Inventors:
Gerard Sablayrolles
Jean-Claude Taulaigo
Jean Lescarboura
By
Karl W. Flocks
Attorney Feb. 16, 1971 G. SABLAYROLLES ET AL 3,564,468

APPARATUS FOR CONTROLLING ELECTRIC CIRCUITS BY THE EFFECT OF A PLURALITY OF MEMBERS INFLUENCED BY A MAGNETIC FIELD AND ARRANGED IN PARALLEL

Filed June 17, 1969 3 Sheets-Sheet 3

United States Patent Office 3,564,468

Patented Feb. 16, 1971

3,564,468

APPARATUS FOR CONTROLLING ELECTRIC CIRCUITS BY THE EFFECT OF A PLURALITY OF MEMBERS INFLUENCED BY A MAGNETIC FIELD AND ARRANGED IN PARALLEL

Gerard Sablayrolles, Villepreux, Jean-Claude Taulaigo, Marly-le-Roi, and Jean Lescarboura, Nanterre, France, assignors to La Telemecanique Electrique, Nanterre, Hauts-de-Seine, France, a joint-stock company of France Filed June 17, 1969, Ser. No. 834,073

Claims priority, application France, June 20, 1968, 155,844

Int. Cl. H01h 9/00

U.S. Cl. 335—207 8 Claims

ABSTRACT OF THE DISCLOSURE

Apparatus for controlling electric circuits by the effect of a plurality of members influenced by a magnetic field and arranged in parallel, comprising two portions of which one has a relative movement with respect to the other; one portion carrying members associated with a magnetic field is formed by a plate capable of supporting a plurality of the said members in parallel lines, the said plate being constituted by a channelled member with a crenellated section so that it is provided on one side with a series of first parallel grooves receiving the said members and on the other side with a series of other grooves inverted; a portion carrying elements influenced by the variation of the magnetic field is constituted by a unit capable of supporting a plurality of these elements in parallel lines, each element having two magnetizable pole-cheeks which project so as to embrace the members associated with the field, carried by the other portion, a plurality of magnetizable gutters with flanges being moved parallel to each other in the inverted grooves of the said plate, each gutter having a gap solely at the position of the sensitive element with which it is associated, while the two gutters located immediately on each side have their gaps located at different points.

When it is necessary to carry out a series of switching operations on electric circuits by the movement in translation or in rotation of a mechanical member, it has already been proposed to utilize the magnetic effect of members creating or alternatively intercepting the magnetic field and which are operative successively in influencing other members affected by this field.

In this way, it is possible to avoid the use of mechanical devices such as sloping faces or cams acting on contacts, such devices being subject to many drawbacks: sensitivity to vibration, inertia and wear. In the magnetic solution, the members creating the magnetic field may be magnetized rods; they may also be magnetizable bodies which modify the reluctance of the field by their presence. The members influenced by the magnetic field may be relays with flexible blades in sealed tubes; they may also be cores of coils forming part of an oscillating circuit. The devices which comprise these members have been designated by the general term of programming device, it being understood that the invention is equally well applicable to all apparatus of the same kind, such as coding devices, impulse generators or course simulators.

The utilization in apparatus of this kind of the influence on a magnetic field is not however without disadvantages. When a number of members influenced by the field are arranged in parallel alongside each other, and when each of the members which create or intercept the field is to act in its turn solely on a receiving device, to the exclusion of its neighbours, special problems are encountered.

If the member influenced by the magnetic field is a flexible-blade relay, it is known that the blades establish their contact when the control magnet has one pole at a sufficiently-small perpendicular distance from the contact surface of the blades. However, the relay is also sensitive to the presence of a magnet which is displaced to the left or to the right of the contact surface of the blades, and there exist critical zones in the space surrounding the tube, in which the magnetic influence can be effective. Precautions must therefore be taken in order to prevent the influence of adjacent magnets from interfering with the proposed switching operation.

It is obviously possible to increase the distance between the adjacent magnets, but this leads to a considerable loss of space if the parallel switching devices are numerous. It is also possible to provide metallic masses which continuously absorb the lateral fluxes of the magnets, but this reduces the useful flux density. There have also been proposed auxiliary magnets associated with the sensitive elements in such manner that the latter operate on a differential flux in the main direction of actuation. This complicates the system and increases the cost of construction.

The present invention provides a remedy for these drawbacks.

The invention comprises essentially two portions, of which one has a relative movement with respect to the other, in translation or in rotation:

(a) The portion carrying the elements influenced by the variation of the magnetic field and the circuit-switching devices with a plurality of sensitive members arranged along parallel axes, each element having two magnetizable pole-cheeks projecting parallel to each other so as to embrace the flux-creating or disturbing members carried by the other portion—a plurality of magnetizable metal gutters of U-section, the flanges of which extend parallel to the direction of travel of the other portion, the said gutters being interrupted only at the position of the sensitive element with which they are associated, while each of the adjacent and parallel gutters are not interrupted at this same point;

(b) The portion carrying the flux-creating or disturbing members, consisting of a plate capable of supporting a number of the said members in parallel lines. The movement is advantageously a movement of translation, The members are preferably magnets which are capable of sliding in grooves formed in the plate and provided with adjustment means over the length of each groove.

The bottom of the plate forms successively reversed grooves so as to create a continuous partition between the projecting pole-cheeks and the extensions of the magnets.

The element influenced by the flux is a flexible-blade relay. The magnetizable cheeks of the flexible-blade relays are shaped so as to guide the flux in a direction longitudinal to the flexible blades.

The element influenced by the flux is a core carrying a winding which acts in an oscillator.

The element which modifies the reluctance of the above element is a magnetic mass calculated so as to vary the reluctance by an amount sufficient to block the oscillator.

Other characteristic features and advantages of the present invention will be brought out in the description which follows below, reference being made to the accompanying drawings, in which.

Figures 3, 5, 6:
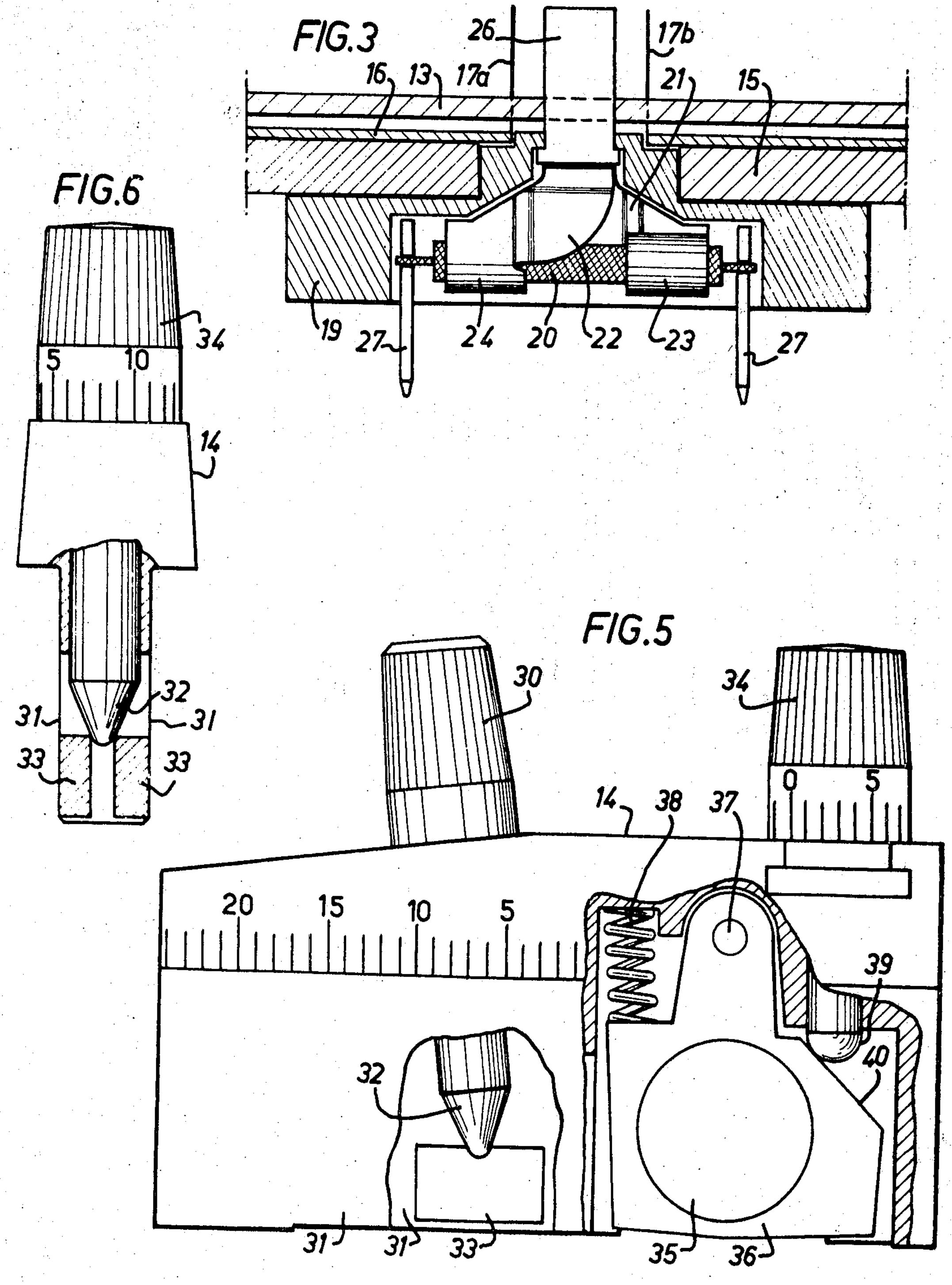

FIG. 5 gives a view in elevation with parts broken away, of one of these flux creating members or magnet supports in this form of embodiment;

FIG. 6 is an end view with partial cross-section.

In the form of construction shown, a programming device according to the invention comprises a fixed portion or plate 1 and a portion or unit 2 movable in translation. The plate 1 is rigidly fixed on a frame 3 and the unit 2 is rigidly fixed on a moving element 4, which gives this unit its movement of translation.

Longitudinal upright members 5 of the frame and an endless follower screen 6 coupled to the moving element 4 form with the base 7 an air-tight space in which the unit 2 moves. The follower screen 6 has the shape of a belt moving over rollers 8, and having one of its edges sliding in a rebate 5*a* in the uprights 5, while the other edge slides in a rebate 7*a* of the base 7.

Between the upright members 5 is arranged a channel-section member 9 having a cross-section of crenellated form. This channel-section member thus has on one side a series of grooves or castellations 10 separated by spaces 11, and on the other side a series of other grooves or castellations 12 separated by spaces 13. A groove of one series corresponds to a space in the other series which forms the bottom of it.

Figure 1:
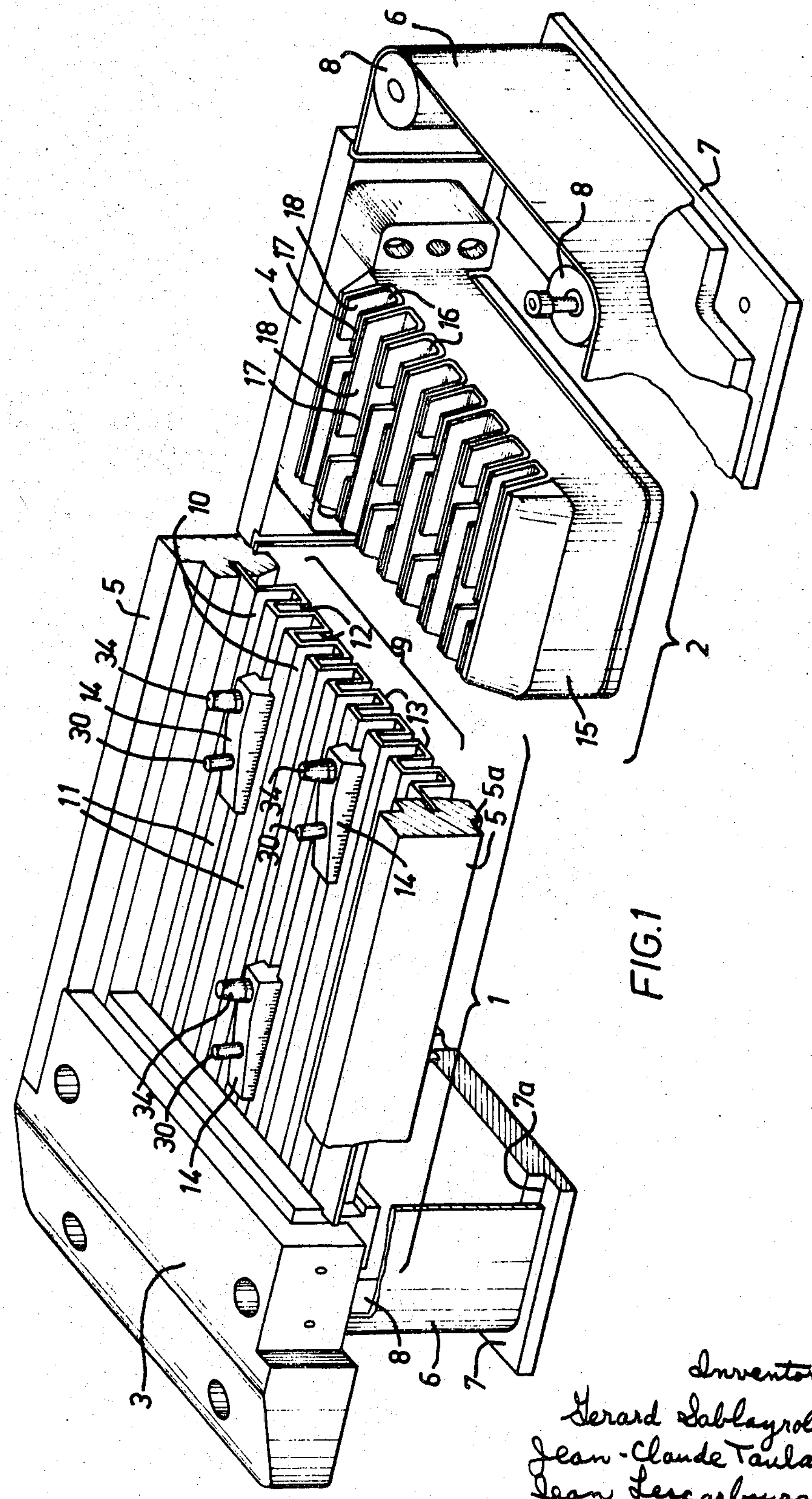
FIG. 1 is a perspective view with parts broken away, of a programming device according to the invention.

In the grooves 10 which are open towards the exterior are placed sliders 14 which carry magnets. For the sake of clearness of the drawings, only three sliders have been shown in FIG. 1.

The unit 2 comprises a casing 15 supporting gutters 16 of magnetizable metal having a U-section, arranged parallel to each other with a small space formed between them. Following this arrangement, each gutter has two flanges 17 and 18, and a flange 17 of one gutter is adjacent a flange 18 of a neighbouring gutter. The group formed by the flange 17 of one gutter with the flange 18 of another gutter can be introduced into one of the grooves 12 of the channel-section member 9, the grooves of which open into the air-tight space in which the unit 2 moves.

Figure 4:
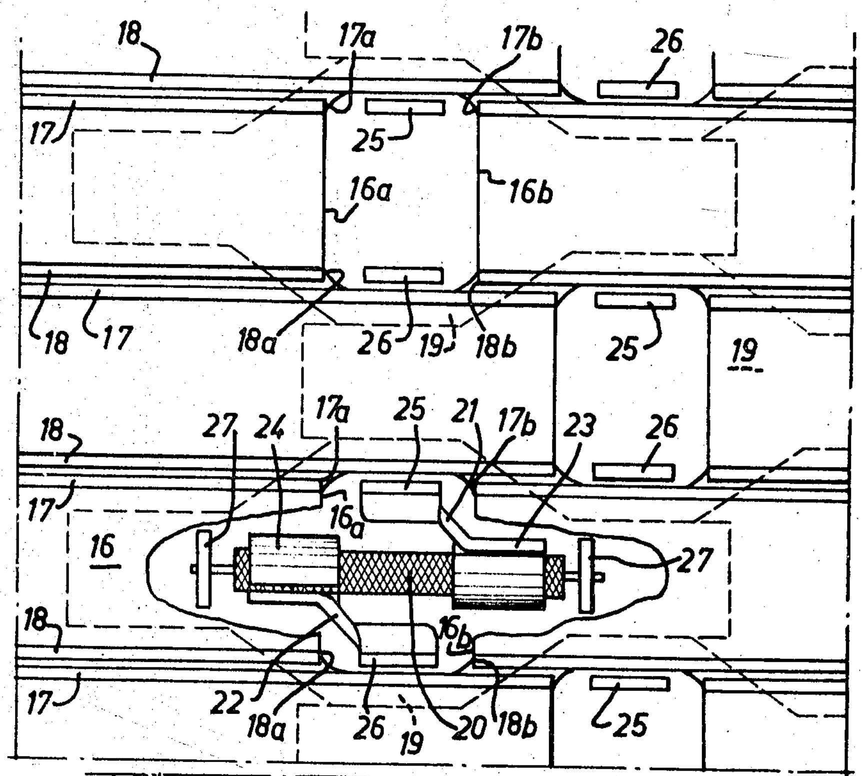
FIGS. 2, 3 and 4 are views, in transverse section, in longitudinal section and in plan view respectively with parts broken away, of the portion carrying the elements influenced by the variation of the magnetic field, and of the portion carrying the flux-creating members.
Figure 2:
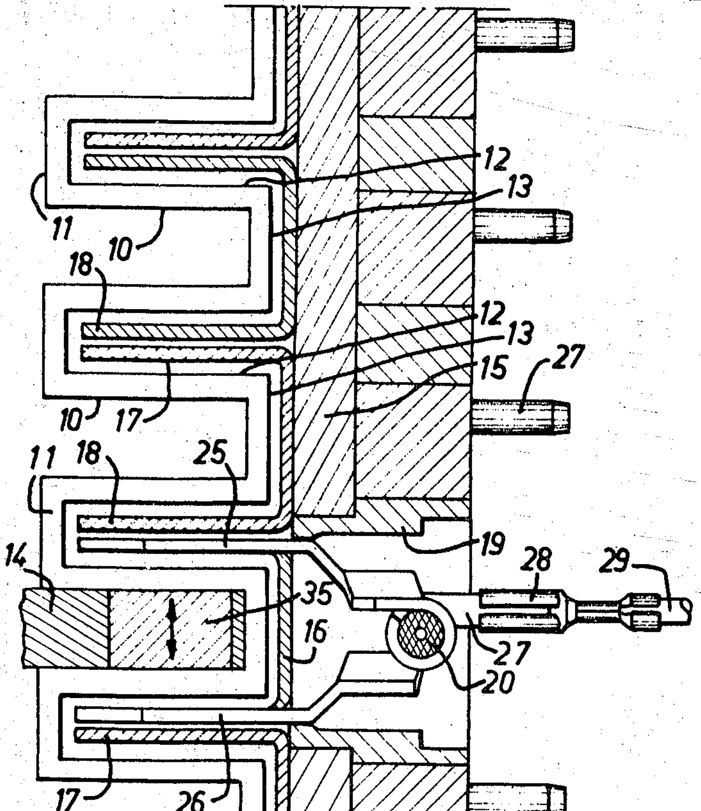

The casing 15 is provided internally, under the gutters 16, with cradles 19, each containing a flexible-blade relay 20 in a sealed tube (see FIGS. 2, 3 and 4).

Each flexible-blade relay is inserted in two magnetizable pole pieces 21 and 22 rolled on it in the form of two sockets 23 and 24. These pieces 21 and 22 pass through the cradle 19 so as to constitute two oppositely-facing cheeks 25 and 26.

A gap in the gutter, formed by an edge 17*a*, 16*a* and 18*a* and an edge 17*b*, 16*b* and 18*b*, leaves a free passage for the cheeks 25 and 26 of the magnetizable pieces 21 and 22.

The flexible-blade relays 20 are provided with terminals 27 connected by thimbles 28 to conductors 29.

The casing 15 and the cradles 19 are non-magnetic as is also the channel-section member 9.

The sliders which can slide in the grooves 10 of the member 9 are provided with a locking knob 30. This knob works by spreading apart the side-plates 31 of the slider by the effect of a wedge 32 which is introduced between the oppositely-facing plates 33 of these side members.

The slider is also provided with a fine adjustment knob 34 which permits the position of the magnet 35 contained in the slider to be regulated when this latter has been locked in the groove.

The magnet 35 is held in a quadrant 36 capable of pivoting about a shaft 37 against the action of a spring 38 and under the force applied by a finger 39. This finger is actuated by the knob 34 and acts on a sloping face 40 of the quadrant.

The programming device of small dimensions according to the invention operates in the following manner:

The moving element 4 on which is fixed the unit 2 may be for example a to-and-fro translator element of a machine-tool, especially a milling-machine, which explains the presence of the follower screen 6 intended to protect the sensitive elements from dust and other waste.

When this element 4 is displaced, each interruption or gap formd in a gutter 16 and thus the magnetizable cheeks 25 and 26 which open into this gap reach, at a given moment of the movement, at the level of the magnet 35 of the slider 14 which has been placed on the travel of this gap in the gutter and the cheeks 25 and 26.

The position of the slider on the plate 1 is of course in accordance with this fixed by the programme.

It will be understood that in the switching operations of the programme from one groove 10 to that adjacent, the adjustment of the sliders 14 is staggered by a space corresponding to that between the gaps in the gutters. The parts 11 may be provided with graduations, the origins of which will be alternately staggered by a corresponding length or alternately they may have two different types of slider.

At this instant, the sensitive-blade relay 20 is actuated by the magnetic field guided by the parts 21 and 22, and the cheeks 25 and 26 of which embrace the magnet 35 of the slider.

No other magnetic influence is operative in this control by reason of the arrangement of the immediately adjacent gutters, the gaps of which are not at the same level as the gap in the gutter considered. These adjacent gutters close the lateral fields which are liable to disturb the magnetic field channelled by the parts 21 and 22.

Finally, the following further advantages may be noted in connection with the capacity of the whole apparatus:

The adjustments 30 and 34 are very accessible, since the sliders 14 with magnets 35 are located on the fixed portion or plate 1 of the programming device according to the invention.

The cradles 19 which contain the relays 20 are removable and accessible, so that these relays can be readily changed.

In particular, the sealed tubes of the flexible blade switches may be mounted with their axes oblique or even perpendicular to the direction of the longitudinal movement of the magnetic bodies, provided that the magnetic cheeks are shaped in an appropriate manner with respect to these bodies. The elements influenced by the variation of the magnetic field may be made in the form of entirely static transducers such as cored inductances in which the windings are traversed by currents from oscillating circuits. In this case, the circuits operate, in known manner as approach detectors with respect to the magnetic masses carried by the sliders. The magnetic masses are then calculated so that their presence between the magnetic cheeks causes locking of the oscillator.

The elements influenced by the variation of the magnetic field may be constituted by semi-conductors with magnetic control, such as magneto-diodes.

It will of course be understood that the above description has only been given by way of indication and not in any limitative sense, and the invention is capable of receiving numerous alternatives in conformity with its spirit.

What is claimed is:

1. An apparatus for controlling electric circuits by the effect of a plurality of members influenced by a magnetic field and arranged in parallel, said apparatus comprising:

members associated with a magnetic field;

a plate adapted to support a plurality of said members in parallel lines, said plate being constituted by a channelled member with a crenellated section, so that on one side it is provided with a series of first parallel grooves receiving said members and, on the other side, a series of second grooves inverted with respect to said first series;

elements influenced by the variation of the magnetic field;

a unit adapted to support a plurality of said elements in parallel lines, each element having two magnetizable pole-cheeks which project so as to embrace said members associated with the field, carried by said plate;

a plurality of magnetizable gutters provided with flanges and moving parallel to each other in said inverted grooves of said plate, each gutter having a gapped portion solely at the position of the sensitive element with which it is associated, while the two gutters located immediately on each side are not gapped at this same place, said plate and said unit having a relative movement with respect to each other.

2. An apparatus as claimed in claim 1, in which said members associated with the magnetic field are members which create said field and are constituted by magnets adapted to slide in said first grooves of said plate, and are each provided with adjustment means for immobilization along the length of said groove.

3. An apparatus as claimed in claim 1, in which each of said elements influenced by the magnetic field is a flexible-blade relay.

4. An apparatus as claimed in claim 3, in which said magnetizable cheeks of said flexible-blade relay are shaped so as to channel the flux in the longitudinal direction of said flexible blades.

5. An apparatus as claimed in claim 1, in which each of said elements influenced by the magnetic field is a core carrying a winding which acts in an oscillator circuit.

6. An apparatus as claimed in claim 1, in which each of said elements influenced by the magnetic field is a removable magnetically controlled circuit element.

7. An apparatus as claimed in claim 1, in which said members associated with the magnetic field are members which disturb said field.

8. An apparatus as claimed in claim 1, and further comprising a base, and in which said plate carrying said members associated with the magnetic field is fixed, and said unit carrying said elements influenced by the variation of the field is movable, and endless follower element coupled to said moving unit forming an air-tight space between said fixed plate and said base.

References Cited

UNITED STATES PATENTS

| | | | |
|---|---|---|---|
| 3,249,715 | 5/1966 | Warman ---------- | 335—206X |
| 3,479,625 | 11/1969 | Walker et al. ------ | 335—207X |

OTHER REFERENCES

Microtecnic, vol. 18, No. 5, 1964, pp. 248–249. An article by G. Hardmeier.

GEORGE HARRIS, Primary Examiner

U.S. Cl. X.R.

335—207